US011711223B1

(12) United States Patent
Webber et al.

(10) Patent No.: US 11,711,223 B1
(45) Date of Patent: *Jul. 25, 2023

(54) PROTECTING USER PRIVACY IN PLAYBACK OF USER SESSIONS

(71) Applicant: FullStory, Inc., Atlanta, GA (US)

(72) Inventors: Joel Grayson Webber, Decatur, GA (US); Benjamin David Dean, Atlanta, GA (US); Mark Nicholas Seth Fowler, Midlothian, VA (US)

(73) Assignee: FullStory, Inc., Atlanta, GA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/405,697

(22) Filed: Aug. 18, 2021

Related U.S. Application Data

(63) Continuation of application No. 17/205,751, filed on Mar. 18, 2021, now Pat. No. 11,121,883.

(60) Provisional application No. 62/991,514, filed on Mar. 18, 2020.

(51) Int. Cl.
*H04L 9/32* (2006.01)
*H04L 9/40* (2022.01)
*H04L 9/08* (2006.01)

(52) U.S. Cl.
CPC .......... *H04L 9/3263* (2013.01); *H04L 9/0825* (2013.01); *H04L 63/0263* (2013.01); *H04L 2209/04* (2013.01); *H04L 2209/16* (2013.01)

(58) Field of Classification Search
CPC . H04L 9/3263; H04L 9/0825; H04L 63/0263; H04L 2209/04; H04L 2209/16
See application file for complete search history.

(56) References Cited

U.S. PATENT DOCUMENTS

| 10,282,479 | B1* | 5/2019 | Reeves | G06F 16/955 |
|---|---|---|---|---|
| 11,121,883 | B1 | 9/2021 | Webber et al. | |
| 2015/0149645 | A1* | 5/2015 | Mendez | G06F 40/143 |
| | | | | 709/227 |
| 2016/0147397 | A1* | 5/2016 | Castle | G09B 19/0053 |
| | | | | 715/765 |
| 2016/0267523 | A1* | 9/2016 | Biswas | G06Q 30/0201 |
| 2017/0323026 | A1* | 11/2017 | Le Bras | G06F 16/2358 |
| 2019/0146616 | A1* | 5/2019 | White | G06F 11/3438 |
| | | | | 715/704 |
| 2020/0280855 | A1* | 9/2020 | Avetisov | G06F 21/33 |

* cited by examiner

*Primary Examiner* — J. Brant Murphy
(74) *Attorney, Agent, or Firm* — Fish & Richardson P.C.

(57) ABSTRACT

Methods, systems, and apparatus, including computer programs encoded on a computer storage medium, for protecting user privacy in the playback of user sessions are described. In one aspect, a method includes accessing, for a user session with one or more user interfaces, event data that includes interface data specifying a structure of the user interface(s), and, for each of one or more user interface elements for which content was presented by the user interface(s) during the user session, an encrypted content element including the content of the user interface element encrypted using a public key corresponding to a rule enabling recording of the content of the user interface element and data identifying the rule. Playback of the user session is generated including, for each of the interface element(s), decrypting the encrypted content element for the user interface element and presenting the decrypted content during the playback of the user session.

20 Claims, 6 Drawing Sheets

PROTECTING USER PRIVACY IN PLAYBACK OF USER SESSIONS

CROSS-REFERENCE TO RELATED APPLICATIONS

This application is a continuation application of, and claims priority to, U.S. patent application Ser. No. 17/205,751, titled "PROTECTING USER PRIVACY IN PLAYBACK OF USER SESSIONS," filed on Mar. 18, 2021, which application claims the benefit under 35 U.S.C. § 119(e) of U.S. Patent Application No. 62/991,514, titled "PROTECTING USER PRIVACY IN PLAYBACK OF USER SESSIONS," filed Mar. 18, 2020. The foregoing applications are incorporated herein by reference in their entirety for all purposes.

BACKGROUND

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls).

As user satisfaction with a given website or application can depend on the user's experience with the user interface, user sessions with user interfaces can be recorded and played back to publishers. Some user interfaces, such as user interfaces of banking web pages or applications, present private data or other private content of the users who are interacting with the user interfaces. As this content is typically not required to assess the quality and functionality of the user interfaces and should not be presented to other parties, care should be taken to ensure that such content is not part of the playback.

SUMMARY

In general, one innovative aspect of the subject matter described in this specification can be embodied in methods that include accessing, for a user session with one or more user interfaces, event data that includes interface data specifying a structure of the one or more user interfaces and, for each of one or more user interface elements for which content was presented by the one or more user interfaces during the user session, an encrypted content element that includes the content of the user interface element encrypted using a given public key corresponding to a rule enabling recording of the content of the user interface element and data identifying the rule enabling recording of the content of the user interface element. Each rule corresponds to a key pair that includes a public key and a private key corresponding to the public key. Based on the user session data, playback of the user session that presents the one or more user interfaces is generated. The generating includes, for each of the one or more interface elements, determining, based on the data identifying the rule for the interface element, whether a key storage unit includes the private key of the key pair corresponding to the rule. Responsive to determining that the key storage unit includes the private key of the key pair corresponding to the rule, the encrypted content element for the user interface element is decrypted and the decrypted content is presented during the playback of the user session. Responsive to determining that the key storage unit does not include the private key corresponding to the rule, a masking element is presented in place of the content of the user interface element. Other embodiments of this aspect include corresponding methods, apparatus, and computer programs, configured to perform the actions of the methods, encoded on computer storage devices.

These and other embodiments can each optionally include one or more of the following features. In some aspects, each rule corresponds to one or more user interface elements and enables recording of content of the corresponding one or more user interface elements.

In some aspects, presenting, in place of the content of the user interface element, a masking element includes determining a presentation size of an object that includes the content of the user interface element and sizing the masking element based on the presentation size of the object.

Some aspects include receiving a request to delete a given rule and, in response to receiving the request to delete the given rule, deleting the given rule from a set of active rules that are downloaded to client devices prior to or during user sessions with user interfaces and deleting the private key of the key pair corresponding to the given rule.

In some aspects, the one or more user interfaces present a set of user interface elements that includes, as whitelisted user interface elements, the one or more user interface elements and one or more non-whitelisted user interface elements. These aspects can include providing, to a client device at which the user session occurs and prior to the user session occurring, the rule corresponding to each of the one or more user interface elements and the public key of the key pair corresponding to the rule. These aspects can include providing, to the client device, data that causes the client device to replace content of each non-whitelisted user interface element with a corresponding masking element and provide the corresponding masking element for each non-whitelisted element with the session data.

In some aspects, each encrypted content element is encrypted using a public key for a user of the user session. Generating, based on the user session data, playback of the user session that presents the one or more user interfaces can include, for each of the one or more interface elements, determining whether the key storage unit includes a private corresponding to the public key of the user. Whenever the key storage unit includes the private key corresponding to the public key of the user, the encrypted content element for the user interface element is decrypted and the decrypted content is presented during the playback of the user session. Whenever the key storage unit does not include the private key corresponding to the public key of the user, the masking element is presented in place of the content of the user interface element.

Particular embodiments of the subject matter described in this specification can be implemented so as to realize one or more of the following advantages. The techniques described in this document protect users' privacy by preventing content, e.g., private or sensitive content, from being collected and/or presented during playback of user sessions. Encryption techniques described in this document can prevent user data from being presented during playback and prevent others from accessing user data, e.g., during transmission of the user data from a user device to an evaluation system or while stored by the evaluation system.

User devices that collect and send session data that is used to generate the playback of the user sessions can be configured to not provide content, e.g., text or images, presented during the user sessions by default. Rules can be used to only collect certain content of user sessions, e.g., content within particular user interface elements. Content without a corresponding rule can be masked to hide the content during playback. This protects user privacy by preventing collection and presentation of content that may include user data unless the publisher of the user interface generates a rule that enables collection of the content. Such content that is collected and transmitted from the user device can be encrypted using encryption keys.

Each rule can have a corresponding key pair that includes a public key and a private key that corresponds to, e.g., that is mathematically linked to, the public key. A public key can be used to encrypt data, e.g., as an encryption key, and a corresponding private key can be used to decrypt the data, e.g., as a decryption key. During a user session when the user device collects data for a user interface element that has a corresponding rule that enables the content of the user interface element to be collected, e.g., rather than masked, the user device can use the public key corresponding to the rule to encrypt the content. During playback of the user session, the playback device can use the private key corresponding to the rule to decrypt the content and present the content, e.g., as the content was presented to the user during the user session. If the publisher or another entity decides that the content associated with a rule or user interface element should no longer be collected or presented during playback, the private key can be deleted so that the content of the user elements can no longer be presented during playback. That is, even content previously collected and encrypted using the encryption key would no longer be able to be shown during playback as the content cannot be decrypted without the corresponding private key.

As the same user interface element, e.g., an account summary element or virtual checkout element, may be presented in many different user sessions and too many different users, this enables a publisher to prevent the presentation of particular types of user data and user data presented in particular user interface elements by simply deleting a private key. This saves significant amounts of time and computing resources relative to searching through vast amounts of stored session data to identify user sessions that included the user interface elements or the particular type of user data and deleting such data. This is also a more accurate approach that ensures that none of the user data can be accessed and presented after deletion of the key, whereas some user data may be missed when searching logs of session data. Thus, the use of encryption techniques described in this document provides efficient and thorough ways of protecting user privacy during recording and playback of user sessions.

Content redaction techniques described in this document can be used to identify content of particular user interface elements that were presented and remove, from stored session data for user sessions, only the content included in the particular user interface elements. This enables the system to remove the content included in those user interface elements without having to delete other data, e.g., all content presented during all user sessions of a publisher's user interfaces or all content of user sessions that included the particular user interface elements. This enables the publisher to view the other content during the playback of the user sessions without viewing any removed content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
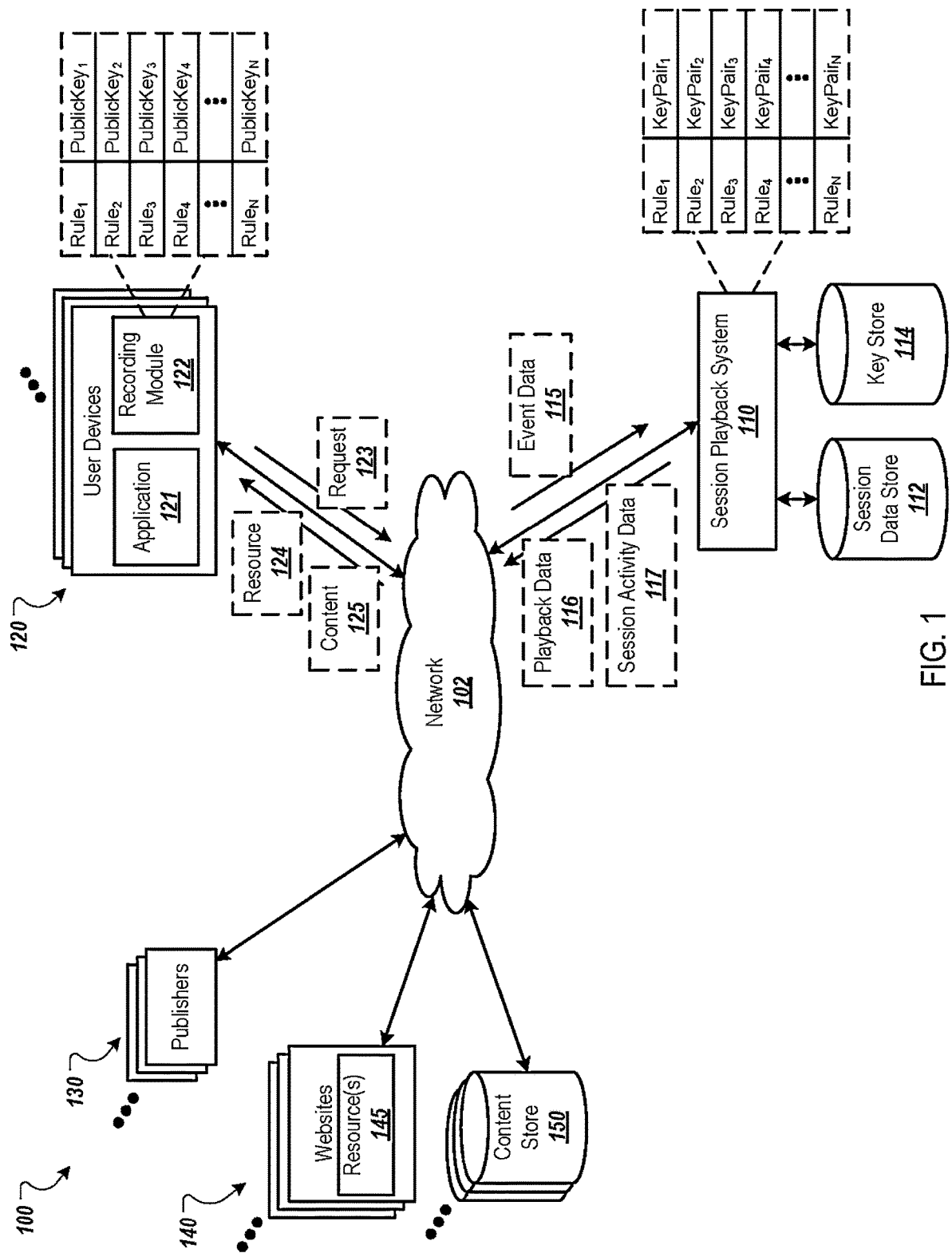
FIG. 1 is a block diagram of an example environment in which a session playback system obtains event data for user sessions and generates playback of user sessions using the event data.

The techniques described in this document allow publishers to optimize their user interfaces (e.g., user interfaces of web pages or application interfaces) so that users have a positive experience interacting with the user interfaces while also protecting the privacy of the users that view and interact with the user interfaces. As the need to protect user privacy has become a growing concern, these techniques are vital in any technology that touches user data. The techniques described in this document prevent user data from being presented during the playback of user sessions with the user interfaces. At the same time, very specific data, such as data related to the structure of the user interface and the size of elements presented in the user interface, can be collected to recreate user sessions that accurately reflect the user interfaces presented to the users, the changes to the user interfaces that occurred during the user sessions, and the user interactions that occurred during the user sessions without showing actual user data or showing only user data for which a data collection rule has been configured, e.g., by the publisher of the user interface.

For example, a website or mobile application of a bank shows customers their balances, transactions, and other data that is private to the user. The actual text showing the transactions and balances is not useful in assessing the quality of the website or application and the customers would prefer that such data is not presented to others that are assessing the quality of the website or application. The techniques described in this document prevent such data from being presented and replaces the data in playbacks such that the playbacks accurately reflect the user interfaces viewed by the customer, but without the user's actual data.

The techniques also give publishers fine-tuned control over what content is presented during user sessions with their user interfaces. To protect user privacy, the recording module can be configured to mask (e.g., obscure or replace) all content presented by user interfaces by default. In this way, the content can be replaced with masking elements at the user device and the masking elements can be sent to a session playback system in place of the actual content. If a publisher wants to view content, e.g., text or images, presented in particular user interface elements, e.g., in a particular table or menu, the publisher can configure a rule (or a rule can be configured by the playback system in response to interaction with the user interface element as described below) that enables the recording module to send the actual content that is presented in the particular user interface element rather than a masking element. In this way, only content having an associated rule will be collected and transmitted from a user device, ensuring user privacy by default.

If actual content is going to be sent from a user device, the content can be encrypted prior to the content being sent from the user device. Each rule can have corresponding encryption keys that are used to encrypt and decrypt the content. For example, each rule can have a corresponding key pair that includes a public key and a private key that corresponds to the public key, e.g., that is mathematically linked to the public key. The recording module can encrypt the content using the public key and the playback system can decrypt the content using the corresponding private key. During playback of user sessions, the playback system can decrypt the content using the private key corresponding to the rule that enabled the content to be collected.

Using encryption keys in this way ensures that the actual content cannot be accessed by any party that does not have the private key. The use of encryption keys also enables the publisher or playback system operator to prevent access to, and presentation of, content of particular user interface elements by deleting the private key rather than searching through logs of user sessions in attempt to identify every session that included presentation of the particular user interface element. As the names of user interface elements can change over time, e.g., by developers who develop the user interfaces, such search and destroy techniques may not ensure that all content, e.g., user data, is found and deleted. By deleting the private key that is required to decrypt the content, the content cannot be accessed even if it still exists in storage. This saves significant time and better ensures complete user privacy relative to search and destroy techniques and other techniques.

Overview of the System

FIG. 1 is a block diagram of an example environment 100 in which users interact with user interfaces. The example environment 100 includes a network 102, such as a local area network (LAN), a wide area network (WAN), the Internet, or a combination thereof. The network 102 connects user devices 120, publishers 130, websites 140, and session playback system 110. The example environment 100 may include many different user devices 120, publishers 130, and websites 140.

A website 140 is one or more resources 145 associated with a domain name and hosted by one or more servers. An example website is a collection of web pages formatted in HTML, that can contain text, images, multimedia content, and programming elements, such as scripts. Each website 140 is maintained by a publisher 130, which is an entity that controls, manages and/or owns the website 140.

A resource 145 is any data that can be provided over the network 102. A resource 145 is identified by a resource address that is associated with the resource 145. Resources include HTML, pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 120, which is also referred to as a client device, is an electronic device that is capable of requesting and receiving resources over the network 102. Example user devices 120 include personal computers, mobile communication devices (e.g., tablet computer, smartphone, wearable device, etc.), and other devices that can send and receive data over the network 102. A user device 120 typically includes one or more user applications 121, such as a web browser and/or native applications, to facilitate the sending and receiving of data over the network 102. A native application is an application developed for a particular platform or a particular device. Publishers 130 can develop and provide the native applications to the user devices 120. For example, users can download the native applications to their user devices 120.

A user device 120 can submit a resource request 123 that requests a resource 145 from a website 140 (or other online location). In turn, data representing the requested resource 124 can be provided to the user device 120 for presentation by a web browser of the user device 120. The requested resource 145 can be, for example, a home page of a website 140, a web page from a social network, or another electronic resource 145. The data representing the requested resource 124 can include data that causes presentation of content 125 (e.g., embedded content such as text that is included in the code of the resource) at the user device 120. The content 125 can include individual content items, such as individual images, buttons, icons, logos, groups of text, or other units of content.

The data representing the requested resource 124 can also include instructions that cause the user device 120 to request remote content from a content store 150. The remote content can include, for example, images, content that is updated periodically, content used across multiple different resources, or content provided by third parties (e.g., other than the publisher). Thus, the remote content can be updated or changed without having to update the resource code.

A native application can also present content with or without the user device 120 submitting a request for the content. For example, some native applications, e.g., games, can present content stored at the user device 120 without requiring a request for content. Other native applications, e.g., news applications, can request and present content obtained from a content store 150 or an application server maintained by the publisher 130 of the native application.

The session playback system 110 generates and provides, to devices of the publishers 130, interactive interfaces that present playback of user sessions with user interfaces of the publishers 130. To generate the interactive interfaces, the session playback system 110 collects event data 115 from the user devices 120. As used throughout this document, the phrase "event data" refers to data related to a user session with one or more user interfaces obtained from a user device 120 during or after the user session. A user session is a period of user interaction with one or more user interfaces, e.g., of a website or native application, of a publisher 130. In the context of a website, the user session can begin when a user requests a first resource from a given domain (e.g., example.com) and can end when a session end condition is met. In the context of a native application, the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 120 for some time (e.g., until the user reopens the browser or again launches the native application) prior to the user device 120 submitting the session end message to the session playback system 110.

The application 121 (e.g., a web browser or native application) can be configured to collect and send event data 115 related to the application 121 to the session playback system 110. For example, a publisher 130 can obtain computer-readable code from a third party that manages the session playback system 110 and install the code in a website or native application. The code can be in the form of an application programming interface (API), a library, a software development kit (SDK), code that launches an instrumentation module, a plug-in to the application 121 that is launched when the application 121 is launched, or other code capable of collecting (or causing the application 121 to collect) data and send the data to the session payback system 110. For brevity, such code can be referred to as a recording module 122. As described below, the recording module 122 can be configured to access a set of rules that define what content can be collected and sent to the session playback system 110.

The event data 115 can include data that can be used to generate playback the user session. Rather than recording a video of the user session, the recording module 122 can collect event data 115 that is used to recreate the user session, e.g., without using recorded video or screenshots captured during the user session. This reduces the amount of data that the user device 120 stores and sends over the network 102, reducing bandwidth consumption, data usage of a mobile device, and/or reduces the consumption of limited memory of the user device 120, as transmitting video or screenshots of a user session requires the transmission of substantial amounts of data. The recording module 122 can stream the event data 115 from the user device 120 during a user session or collect the event data 115 at the user device 120 and send the event data 115 to the session playback system 110 after the user session ends.

The event data 115 can include, for example, interface data, user interaction data, and/or mutation data. The interface data specifies a structure of a user interface that is presented at a user device during the session. For example, when the user device 120 renders a resource 145, the interface data can be an initial Document Object Model (DOM) of the resource that is first presented at a user device 120. In this example, the DOM would specify that the resource is initially presented. In the context of native applications, the interface data can include a view tree or other hierarchical data structure that specifies the views presented by a user interface of the native application.

The user interaction data specifies user interactions at the user device, and include user interactions with the elements of the user interface. The user interaction data can specify mouse movements, user clicks, mouse hovers, highlights, text inputs, and any other user interactions that are performed at the user device. The user interaction data specify user interactions at the user device, and include user interactions with the elements of the user interface. The user interaction data can specify mouse movements, user clicks, mouse hovers, highlights, text inputs, and any other user interactions that are performed at the user device. For example, assume that a user clicks on an item in a list, in this example, the user interaction data will specify that a user click occurred and identify the element of the user interface that was clicked.

The user interaction data for a user interface element with which a user interacted can identify the user interface element using a unique identifier for the user interface element. The identifier for a user interface element can be in the form of an alphanumeric sequence that is unique for each user interface element. For resources that include a DOM, the resource identifier can be the identifier for an object, e.g., obtained from the DOM id property. This enables the session playback system 110 to aggregate the number of user interactions with each user interface element across multiple user sessions of multiple different users.

The user interaction data can also include timestamp information and/or sequential numbering information specifying when each user interaction occurred so that the user interaction data can be coordinated with other data. For example, the user interaction data can specify an absolute time at which a given user interaction occurred and/or a number representing when a given user interaction occurred relative to other user interactions a set of user interactions (e.g., user interaction 50 out of 150 total user interactions).

The user interaction data can be obtained, for example, by inserting an interaction tracking script in the code of the resource (or native application). The interaction tracking script will monitor mouse movement, clicks, and other user actions. In the context of a tablet or other touchscreen device, the interaction tracking script monitor user taps, swipes, pinches, and other user interactions with the touchscreen device. For some native applications, the user interaction data can be obtained using reflection techniques to determine which user interface elements are interacted with, as described in U.S. patent application Ser. No. 16/038,002, filed on Jul. 17, 2018, entitled "Capturing and Processing Interactions with a User Interface of a Native Application," which is herein incorporated by reference in its entirety. For some native applications, user interaction data can be obtained by swizzling methods that detect user interactions, as described in U.S. patent application Ser. No. 16/370,574 filed on Mar. 29, 2019, entitled "Capturing and Processing Interactions with a User interface of a Native Application," which is herein incorporated by reference in its entirety.

Using these techniques, the user interaction data can specify the actual user interface element interacted with based on the current structure of the DOM or view tree used to generate the user interface. This allows the data to specify the actual element event for dynamic user interfaces for which the structure can change and/or new elements can be presented by the user interface. For example, if a pop up window is presented, e.g., based on a script or in response to a user interaction, and a user interface element of the pop up window is interacted with, the interaction data can specify the user interface element of the pop up window with which the interaction occurred as this data would be part of the DOM structure or the view tree of a native application.

The mutation data can specify each user interface element that is rendered by the user device 120, and the mutation data can be provided to the session payback system 110 (e.g., either sequentially or in sets of mutation data that were accumulated over a specified time by the user device 120). Using the mutation data, the session payback system 110 can reconstitute the DOM in a manner similar to that performed by a browser. The mutation data can be obtained, for example, by inserting a mutation observer script in the code of the resource (or native application). The mutation observer script can monitor the resource for changes to the structure of the resource, record (e.g., collect) mutation data representing the changes in local memory at the user device 120, and provide the mutation data to a specified location (e.g., the session payback system 110). Providing mutation data rather than recorded video of the user session reduces the amount of data that has to be recorded and transferred across the network 102. This limits the negative latency impact and bandwidth consumption of this technology.

The mutation data specifies changes to the structure of the user interface that occur during a user session. For example, assume that a user clicks on an item in a list, which causes a first image to be replaced by a second image. In this example, the mutation observer script can detect the removal of the first image and the addition of the second image in the user interface, and store mutation data at the user device 120 specifying that the first image was removed from the user interface and that the second image was inserted into the user interface.

Alternatively, or additionally, the mutation data can directly specify the replacement of the first image by the second image (e.g., rather than specifying both the remove mutation and the add mutation). Periodically, the user device 120 can upload (or otherwise transmit) the mutation data to the session payback system 110, which processes the mutation data as described in more detail below.

In the context of native applications, the recording module 122 can generate and provide a view tree for multiple frames of the user interface during the course of the user session. For example, the recording module 122 can generate a view tree based on the current state of the user interface of the native application periodically based on a specified time period, e.g., 300 milliseconds, 1 second, 2 seconds, or another appropriate time period. Each view tree can be included in a frame bundle that includes the view tree for one or more points in time, data identifying each view in the view tree, and user interaction data for user interactions that occurred during a time period captured by the frame bundle. Each view tree can specify each user interface element presented at the time corresponding to the view tree. Each user interface element can be a particular view in the view tree.

In some implementations, each user interface element is identified by a number (or a name) corresponding to the order in which the user device rendered the user interface elements. The mutation data (or frame bundle) can also include timestamp data, which can be used to correlate the mutation data (or frame(s) represented by the frame bundle) with other data (e.g., user interaction data). The mutation data or frame bundles can continue to be provided to the session playback system 110 throughout the user session, such that the mutation data (or frame bundles) obtained by the session playback system 110 represents all changes to the user interface over the user session.

In some implementations, the numbering representing the order of user interactions and the numbering representing the order in which the user device rendered the user interface elements are a same numbering sequence. In such implementations, the numbering provides a relative order of both changes to the user interface and user interactions with the user interface. For example, assume that a last page element rendered and given a number of x. Further assume that the next event was a user interaction with the user interface, which led to a subsequent change in the DOM. In this example, the user interaction could be assigned a number x+1 (or some other incremental amount other than 1), and the mutation data corresponding to the change in the DOM could be assigned a number x+2. Thus, the numbering scheme would indicate that the user interaction occurred between the rendering of the last page element and the change in the DOM.

Example techniques for obtaining event data that can be used to generate playback of user sessions are described in U.S. Pat. No. 9,766,769, filed on Dec. 31, 2014, entitled, "Evaluation of Interactions with a User Interface," and U.S. patent application Ser. No. 16/038,002, filed on Jul. 17, 2018, entitled "Capturing and Processing Interactions with a User Interface of a Native Application," and U.S. patent application Ser. No. 16/370,574 filed on Mar. 29, 2019, entitled "Capturing and Processing Interactions with a User interface of a Native Application," which are herein incorporated by reference in their entirety.

The session playback system 110 receives the event data 115 from the user device 120 and stores the event data 115 in a session data store 112. For example, the session playback system 110 can store the event data 115 in an index of session data that is stored in the session data store 112. The index of session data can include, for each user session, session data for the user session. The user session data for a user session can include the event data 115 received for that user session and optionally additional data, such as context data relating to user device 120 (e.g., the type of user device 120, the make and model of the user device 120, hardware and/or software of the device, the geographic location of the device, etc.). The software specified by the context data can include the type of browser, version of the browser, or other data about the browser.

The session playback system 110 can index the event data 115 and the contextual data in the session data store 112. This enables a user to search for user sessions that include particular events or attributes and/or filter user sessions based on the events or attributes. For example, the session playback system 110 can receive a query for one or more attributes, e.g., a type of browser and type of event (e.g., one or more rage clicks) that occurred during the user session. The session playback system 110 can use the index to identify each user session that occurred using the type of browser specified by the query and during which an event of the type specified by the query occurred. The session playback system 110 can then provide data that presents the identified user sessions in an interactive interface.

Techniques for Protecting User Privacy Using Encryption During User Session Recording The recording module 122 can be configured to record, in the event data 115, content of user interface elements based on a set of rules. For the purposes of this document, recording refers to the collection of data that can be used to reconstruct the user interfaces presented during a user session rather than the recording of a video or still images (e.g., screenshots) of the user interfaces during the user session. User interface elements can be defined based on the structure of the document or code used to generate the user interfaces. For example, if the user interface is generated using an HTML document, an eXtensible Markup Language (XML) document, or a DOM that represents the document, the user interface elements can be defined by nodes, tags, fields within tags, or attributes within tags. For example, the rule can specify particular tags, fields, attributes, or other structural elements of the DOM from which content can be uploaded to the session playback system 110. For native applications, the user interface elements can be defined by identifiers of the views, e.g., the names of the classes that are used to generate the rules.

The rules define user interface elements from which content (e.g., text, tables of text, images, videos, etc.) can be collected/recorded and provided to the session playback system 110. The rules can be in the form of a whitelist that specifies the user interface elements for which content can be recorded and provided to the session playback system.

The rules can also include exclusion rules and masking rules. An exclusion rule can specify whether the content of a user interface element is to be completely removed from the event data 115. A masking rule can specify whether content of a user interface element is to be replaced with an irreversibly-transformed (or at least difficult to reverse) representation of the content, e.g., a hash of masked text or blurred or single color image for masked images. This allows masked and recorded user interface elements, e.g., views, to be nested within one another in a way that is not possible with excluded views.

In some implementations, the recording module 122 only provides, with the event data 115, content of user interface elements having a corresponding rule. That is, the recording module 122 excludes content of user interface elements for which the recording module 122 does not have a rule. In this way, user data is protected by default.

If the publisher of a user interface wants to be able to view content of particular user interface elements, the publisher 130 can specify a rule for the user interface element. The rule can specify that all content of the user interface can be recorded and sent from user devices 120 to the session playback system 110. A rule can also specify that particular content of a user interface element can be sent from user devices 120 to the session playback system 110, while other content of the user interface element cannot be sent. For example, a rule may specify that content within particular fields or particular attributes of a particular tags can be recorded, while content in other fields or attributes of the particular tags cannot be recorded.

The user interface elements for which content can be recorded can also be referred to as whitelisted user interface elements. For example, the session playback system 110 can maintain a whitelist that specifies the user interface elements or the rules corresponding to the whitelisted user interface elements. User interface elements for which content cannot be recorded can be referred to as non-whitelisted user interface elements.

Each rule can have corresponding encryption keys. For example, each rule can have a corresponding key pair that includes a public key and a private key that corresponds to the public key. For example, the session playback system 110 can generate a key pair for a rule when the rule is created by a publisher 130. The session playback system 110 can store the key pair in a key store 114, e.g., a key data storage unit that can be a database or other appropriate data structure. For each key pair, the session playback system 110 can link the key pair to the corresponding rule, e.g., using an index. Each rule can have a unique identifier, e.g., that is the name of the user interface element or that is based on the name of the user interface element. As shown in FIG. 1, the key store 114 includes key pairs $KeyPair_1$-$KeyPair_N$ for rules $Rule_1$ to $Rule_N$, respectively.

At the beginning of a user session with one or more user interfaces of a publisher 130, e.g., with a website of a publisher 130 or a native application of a publisher 130, the recording module 122 can obtain the rules for the publisher 130 (or the website or native application) from the session playback system 110. For example, the recording module 122 can request the rules from the session playback system 110 when a user session begins. The recording module 122 can obtain the public keys that correspond to the rules, in a similar manner. That is, the session playback system 110 can provide the public keys that correspond to the rules when providing the rules.

As the recording module 122 processes a user interface to record the structure, content, and other event data 115 of the user interface, the recording module 122 can use the rules to determine which content can be recorded. For example, the recording module 122 can identify the tags or identifier of a view and determine whether the set of rules includes a rule for the user interface element defined by the tags or view. If there is a rule for the user interface element, the recording module 122 can encrypt the content of the user interface element using the public key corresponding to the rule. The recording module 122 can then include, in the event data 115, an encrypted content element. The encrypted content is an encrypted version of the content after the content has been encrypted using the public key. The recording module 122 can also include, in the event data 115, data identifying the rule, e.g., the identifier for the rule. For example, the recording module 122 can include the encrypted data element and the identifier for the rule in the event data 115 in place of the actual content. In this way, the actual content is not recorded and sent to the session playback system 110. As described below, the session playback system 110 can use the private keys to decrypt the encrypted content elements when generating playback of the user session.

In some implementations, the session playback system 110 can also generate a key pair for each user. That is, each user can also have a corresponding key pair that includes a public key and a private key that corresponds to the public key. The key pair for each user can be different from the key pair for each other user.

In this example, each piece of content that is encrypted using a public key corresponding to a rule can also be encrypted using the public key for the user, resulting in twice-encrypted content. For example, during a user session for a particular user, the content of a user interface element having a rule that enables the content to be recorded can be encrypted using the public key corresponding to the rule and the public key corresponding to the particular user. The content can be encrypted using the two keys in either order as long as the session playback system 110 is configured to decrypt the content in the same order. The recording module 122 of each user device 120 can store the public key for the user of the user device 120. The session playback system 110 can store the key pairs so that the session playback system 110 can provide the public keys to the appropriate user devices and Using the two keys enables a publisher 130 or operator of the session playback system 110 to prevent the presentation of content of particular users, while enabling the playback of content of other users by deleting the private keys for the users for which the content should not be presented or by controlling access to the private keys corresponding to particular users. The publisher 130 or operator can also prevent the presentation of content of particular user interface elements by deleting the private keys for the rules corresponding to the particular user interface elements. This enables the publisher 130 and/or operator to effectively delete content that is no longer wanted or needed, or that was erroneously collected, e.g., based on an erroneous rule or change in the structure of the user interface by simply deleting the private key rather than searching for the data in the event data for many user sessions.

When the recording module 122 processes a user interface element that does not have a corresponding rule, the recording module 122 may not include the content of the user interface element in the event data 115. Instead, the recording module 122 can include a masking element having the same size as the content or record the size of an object that includes the content (without including the actual content in the event data 115) so that the session playback system 110 can generate a masking element during playback of the user session.

The encryption keys for a publisher 130 can be managed by the publisher and/or the session playback system 110. For example, the publisher 130 can store a copy of each key pair generated for the user interfaces of the publisher 130. The publisher 130 can also request that the session playback system 110 delete private keys, e.g., if the publisher 130 decides that the content of the user interface elements corresponding to the private keys should no longer be presented during playback of the user sessions with the publisher's user interfaces. However, the publisher 130 can maintain its copy of the private keys in case the publisher 130 wants to assess how the content is being presented in the user sessions. If the publisher 130 determines that the content should be permanently deleted, the publisher 130 can request that the session playback system 110 delete the private key and the publisher 130 can also delete the private key, thereby preventing the content from being decrypted in the future.

Example Techniques for Determining the Size of Objects During Recording

To determine the size of content, the recording module 122 (or the session playback system 110) can measure the size of each piece of content as it is presented in the user interface during the user session. However, measuring the size of objects can be computationally expensive. If the content is the only content of a user interface element, the session playback system 110 can size the masking element for the content based on the size of the object that includes the content. For example, if text is included in a button, the session playback system 110 can size the masking element based on the size of the button, e.g., to fit within the button.

In some cases, changes to a user interface or the structure of the user interface can cause changes in the sizes of content presented by the user interface. For example, a change in a class can result in a change in a style element which results in a change in the size of a user interface element. For user interfaces presented by web browser, to detect changes in the size of user interface elements recording module 122 can use the ResizeObserver API (or other appropriate code) in supported browsers. The ResizeObserver API detects and reports changes to the rectangle in which the content of an element can be placed. The recording module 122 can include data reported by the ResizeObserver API in the event data 115. The recording module 122 can use the data specifying the new size of the element to resize the content of the element in the playback of the user session.

For browsers that do not support the ResizeObserver API, the session playback system 110 can generate a hierarchical graph of user interface elements that represents the user interface elements that can cause changes in the size of other user interface elements. The session playback system 110 can generate the graph using the DOM of the user interface. The size of a first user interface element (e.g., child node) that is nested within a second user interface element (e.g., parent node or grandparent node) can be affected by changes to the second user interface element. The session playback system 110 can detect changes to user interface elements based on the mutation data included in the event data 115. If a user interface element that could impact content is changed, the session playback system 110 can measure the size of the user interface element that includes the content. If the size has changed, the session playback system 110 can change the size of the content at the corresponding time in the playback of the user interface.

This graph can also be used to determine which elements to measure the size of for the purpose of sizing content. For example, the recording module 122 or the session playback system 110 can measure the size of each user interface element corresponding to the parent node of content, without measuring the size of the user interface elements corresponding to other nodes.

For native applications, the recording module 122 can use functions of the platform (e.g., of the operation system) to obtain the size of presented content. For text views, the recording module 122 can collect the actual text presented by the text view, the size of each string of text (e.g., each line of text), and characteristics of the font of the text, e.g., the type, color, and/or size of the font. The recording module 122 can use one or more functions to get the size of a string of text. For example, in Android™, the recording module 122 can use a getTextBounds function to obtain the size of a rectangle that bounds the string of text. This rectangle represents the height and width of the string of text. That is, the rectangle can extend in height from the bottom of the character that extends the lowest in the string of text to the top of the character that extends the highest in the string of text. The rectangle can also extend in width from the leftmost character to the right-most character. The recording module 122 can also use measureText to get the width of a string of text.

In some implementations, the recording module 122 can also use functions of the platform to obtain the baseline and the ascent of each string of text in a text view. The baseline is a hypothetical line on which the characters of the string of text rest and the ascension is the distance from the baseline to the top of the tallest character. This can be used during playback to create a masking element that represents masked (e.g., non-whitelisted) text. For example, a box that represents text may be more aesthetically pleasing and a more accurate replacement of text is the box extends in height from the baseline a distance equal to the ascent rather than having a height equal to the ascent plus the descent (distance from baseline to the bottom of the lowest character).

Techniques for Generating Playback of User Sessions

The session playback system 110 can, for each user session, use the event data 115 for the user session to generate playback of the user session (which can be stored and transmitted as playback data 116) and session activity data 117 for the user session. The session playback system 110 provides the playback data 116 and the session activity data 117 to the publisher 130 that provides or publishes the user interface(s) presented during the user session. For example, the publisher 130 of a website may be the only entity capable of viewing the user sessions of users visiting and interacting with the user interfaces of the web site.

The playback of the user session presents the user interface(s) that were presented during the user sessions, visual changes to the user interface(s) that occurred during the user session, and user interactions (e.g., mouse movements) with the user interface(s) that occurred during the user session. For example, the playback of the user session can show the publisher 130 the mouse movement over a user interface, a click on an item presented in a user interface, etc.

During playback, the session playback system 110 can regenerate each user interface and changes to each user interface in the order that they were presented during the user session, e.g., based on the timestamps and/or sequential numbering information described above. For example, the session playback system 110 can regenerate each user interface based on the structure information for the user interface and the data identifying the user interface elements presented in the user interface.

The playback of the user session can also present the content of presented user interface elements that were included in the event data 115 based on the presented user interface elements having a corresponding rule that enabled recording of the content. As described above, the event data 115 can include such content as encrypted content elements that were encrypted using the public key corresponding to the rule that enabled the content to be recorded (and optionally twice encrypted using a public key of the user).

When generating a user interface, the session playback system 110 can process the event data 115 for each user interface element presented by the user interface. This processing of a user interface element can include determining the presentation position of the user interface element within the user interface and determining what to present in that location. This can include determining whether the data for the user interface element includes data identifying a rule that enabled the actual content to be recorded. If there is no identifier for a rule, the session playback system 110 can present a masking element having the same size as the content in the presentation location.

If the data for a user interface element includes an identifier for a rule, the session playback system 110 can use the identifier to find the private key corresponding to the rule in the key store 114. If the private key is in the key store 114, the session playback system 110 can use the private key to decrypt the encrypted content element and then present the decrypted content in the regenerated user interface as it was presented during the user session. If the private key is not in the key store 114, e.g., if the private key was deleted, the session playback system 110 cannot decrypt the encrypted content element. For example, if the publisher 130 decided that such content should not be presented during playback, the publisher 130 may request that the private key corresponding to the rule be deleted from the key store 114.

To prevent playback from being stalled or breaking due to the deletion of the private key, the session playback system 110 can be configured to generate and present a masking element in place of the decrypted content element in response to not finding the private key. For example, the recording module 122 can record the type and size of each piece of content or an object that includes each piece of content in the event data 115, even for user interface elements that have corresponding rules that enable the content to be recorded. The session playback system 110 can use the type and size of a piece of the content to generate a masking element that has the same size and represents the piece of content within the regenerated user interface during playback so that the user interfaces presented during playback look the same as the user interfaces of the user session, but without the actual content, e.g., the actual text or image presented during the user session.

For user interface elements that were not included in the event data 115 based on the user interface elements not having a corresponding rule that enables the content of the user interface element to be recorded, the playback can include a masking element that represents the content of the user interface element.

For example, if the content is an image, a blank box that represents the image can be presented in the playback of the user session. The blank box that represents the image can be the same size as the image (e.g., the same height and width) and be presented in the same location within the user interface as the image. In this way, the playback accurately reflects how the image was presented in the user interface.

If the content is text, a bar or other masking element can be presented to represent the text. For example, a bar having rounded edges can be presented in the same location and with the same size as the text that the bar is representing. Using such a bar rather than using an algorithm to replace the text prevents the ability to reverse the replacement and determine what the text was actually presented. In addition, the bar can be sized to the actual text more accurately than replacement text based on the differing widths of text characters. For example, if wider characters are used to replace thinner characters, the overall width of a replacement string of text would be larger than the overall length of the actual text, causing the replacement text to not accurately reflect the text that was presented during the user session. Such replacement text may be presented over other objects in the playback or cause other errors in the playback.

The session activity data 117 can present to the publisher 130 a list of events that occurred during the user session. As playback of the user session is presented, (e.g., showing mouse movements and visual changes), the list of events can be highlighted to show which event corresponds to the visual changes that are being presented in the playback.

Example User Interfaces that Illustrate of the Playback of a User Session

Figure 2:
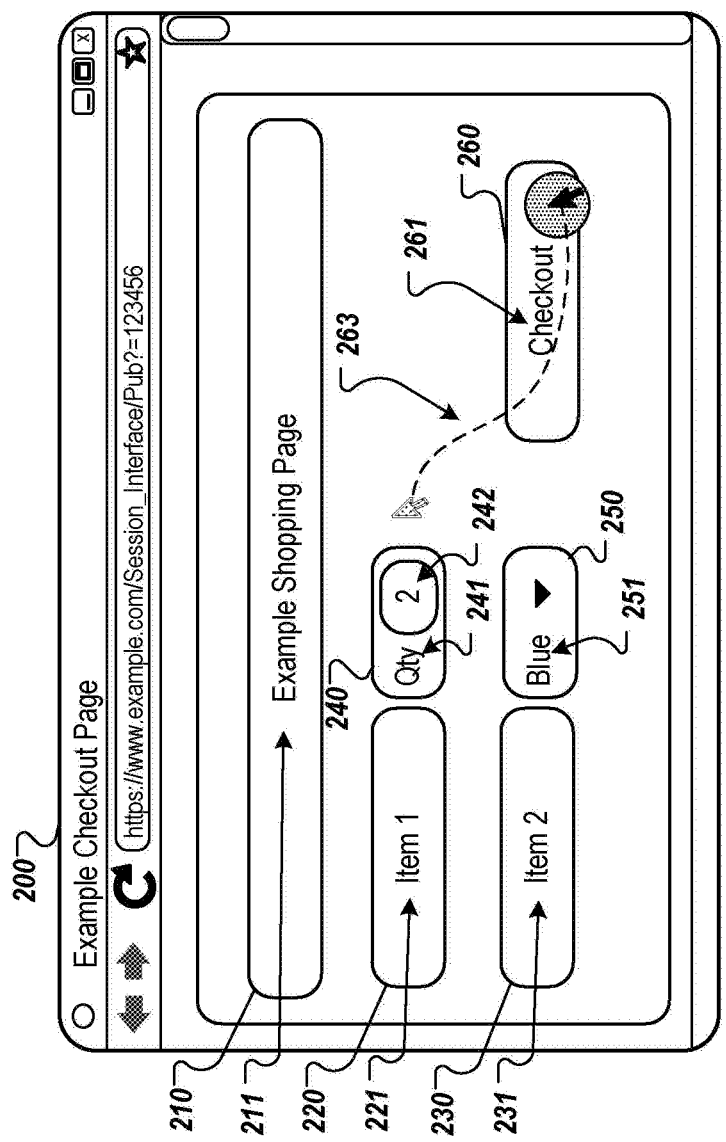
FIG. 2 is an illustration of an example user interface presented during a user session.

FIG. 2 is an illustration of an example user interface 200 presented during a user session. The user interface 200 is an example shopping web page presented by a web browser in response to a user navigating to the URL for the web page. The user interface 200 includes a page title 210 with the text 211 ("Example Shopping Page"). The user interface 200 also includes an element 220 with text 221 ("Item 1"), an element 230 with text 231 ("Item 2"), a form 240 with text 241 ("Qty") and a text entry field 242, a drop down menu 250 with a value 251 ("Blue") presented in the menu 250, and a checkout button 260 with text 261 ("Checkout"). As shown by the dashed line 263, the user viewing the user interface focused a cursor on the quantity form 240 and then moved the cursor over the checkout button 260 and selected the checkout button 260.

A user device presenting the user interface 200 can provide event data to the session playback system 110 of FIG. 1. In this example, the event data would include interface data specifying the structure of the user interface 200. The event data would also include user interaction data specifying the focus of the cursor on the quantity form 240, movement of the cursor to the checkout button 260, and the selection of the checkout button 260.

The event data can also include the content presented in the user interface 200 if the user interface elements that include the content has a corresponding rule. In this example, assume that the publisher of the user interface 200 configured a rule that specified that the "value" field of form tags can be recorded, a rule that specified that content within the "h1" field of "title" classes can be recorded, and a rule that specified that content within the "button class" can be recorded.

Figure 3:
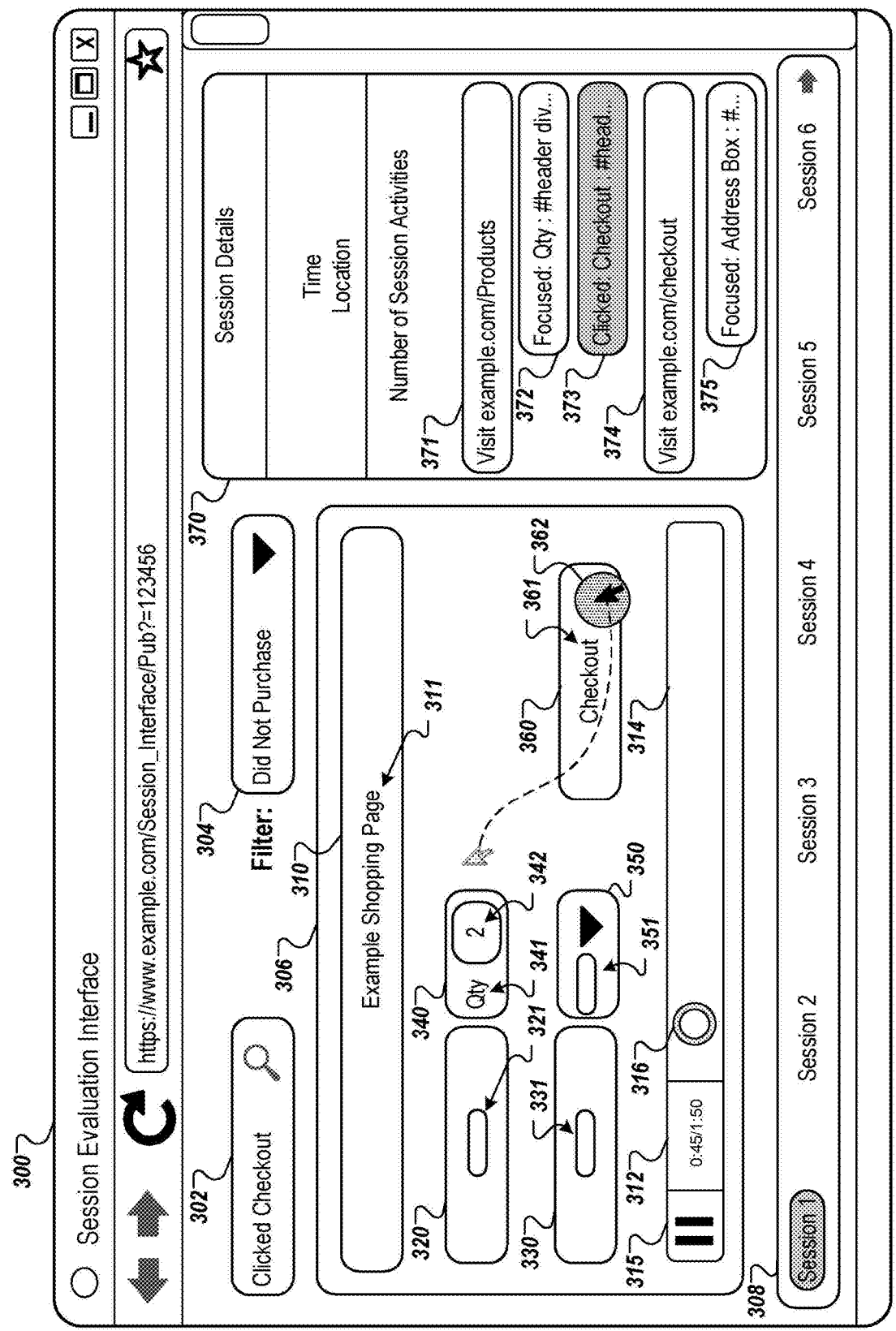
FIG. 3 is an illustration of an example interactive interface for replaying a user session.

FIG. 3 is an illustration of an example interactive interface 300 for replaying a user session. The interactive interface 300 replays the user session with the user interface 200 of FIG. 2. For example, the session playback system 110 of FIG. 1 can generate playback of the user session based on the event data received from the user device that presented the user interface.

The user interface 300 includes a search field 302 that receives search criteria for identifying sessions. For example, assume that a publisher is interested in identifying and/or viewing sessions during which a user clicked a checkout button 360 of a given website (or native application) can enter the search phrase "clicked checkout" in the search field 302. Upon submission of the search phrase (e.g., inputting and enter command or clicking on a submission button), a request for session information is transmitted to the session playback system 110, which may include a search apparatus. The request for session information can include, for example, the search phrase, and identity of the publisher requesting the session information, and/or other information that provides context associated with the request.

In response to receiving the request for session information, the session playback system 110 can use the search phrase "clicked checkout" to identify one or more sessions during which a user clicked the checkout button 304 of the given website. In some implementations, the session playback system 110 identifies sessions responsive to the search phrase from an index of user sessions. For example, the index may include one or more entries associating the user action "click" and the user interface element "checkout button" with sessions during which a user clicked on the "checkout" button 304.

The session playback system 110 provides data identifying sessions responsive to the request for session information to the requesting device. In some implementations, the session playback system 110 can respond to the request for session information by providing data about one or more sessions that were identified based on the search phrase. Continuing with the example above, the session playback system 110 can provide a list of sessions 308 that were identified from the index based on the search phrase "clicked checkout." As illustrated by FIG. 3, the sessions in which a user clicked a checkout button include Session 1, Session 2, Session 3, Session 4, Session 5, and Session 6.

The session playback system 110 can also provide playback data and session activity data for one or more of the identified sessions in response to the request for session information. For example, as illustrated by FIG. 3 Session 1 is shaded, indicating that playback data for Session 1 is available for replay, and that session activity data for Session 1 are available for presentation.

The user interface 300 includes a playback region 306 in which previous sessions are replayed based on the playback data. The playback region 306 includes a playback bar, which includes a play/pause portion 315, a counter 312, and a slider portion 314. The play/pause portion 315 enables a publisher to start and stop replay of the session by interacting with the play/pause portion 315. The counter 312 provides a total duration of the session (e.g., 1 minute 50 seconds) and a portion of the session that is currently being presented (e.g., 45 seconds). The slider portion 314 enables a publisher to quickly move to other portions of the session by sliding a sliding element 316 within the slider portion 314. Continuing with the example above, the playback region 306 is replaying Session 1, as indicated by the shading of Session 1 in the list of sessions.

The playback of Session 1 shows a recreation of the user interface 200 of FIG. 2 based on the event data received from the user device at which the user session occurred. In particular, the replay shows a page title 310 with text 311 that corresponds to the page title 210 and text 211; an element 320 with a masked element 321 that corresponds to the element 220 and text 221; an element 330 with a masked element 331 that corresponds to the element 320 and text 321, a quantity form 340 with text 341 and text entry field 342 that corresponds to the quantity form 240 with text 241 and text entry field 242; drop down menu 350 with a masked element 351 that corresponds to the drop down menu 250 with text 251; and a checkout button 360 with text 361 that corresponds to the checkout button 260 with text 261.

In this example, the text of the elements 220 and 230 either did not include a rule at the time of recording the user session, the private key corresponding to the rule has been deleted (or otherwise cannot be accessed), or, if user keys were used, the private key for the user has been deleted (or otherwise cannot be accessed). If a private key was deleted, the session playback system 110 would be unable to decrypt the actual text of the elements and, in response, would generate the masked elements 321 and 331 having the same size as the original text 221 and 231, respectively.

As described above, the masking elements 321 and 331 can be size based on the size of the element that includes the text, namely the elements 220 and 230. In this way, the masking elements 321 and 331 fit within the elements 320 and 330, similar to the text 221 and 231 represented by the masking element 321 and 331.

Similarly, the session playback system 110 included a masking element 351 in place of the text 251 of the drop down menu 350, e.g., based on a private key being deleted or there being no rule for the drop down menu 350 when the user session was recorded. In this example, the masking element 351 is sized based on the size of the drop down menu 350, e.g., based on the size of the rectangular area in which content of the drop down menu 350 can be placed.

Some masking elements can include multiple masking elements to represent a string of text. For example, a respective masking element can be used to mask each word in the sentence. When generating a masking element, the session playback system 110 can start a new masking element at the beginning of each work and end the masking element when it encounters a space or punctuation indicating the end of the word.

The text 311, 341, 342, and 361 is included in the playback as the content of their corresponding user interface elements has a corresponding rule and the private key(s) for the user interface elements were retrieved and used to decrypt the encrypted content elements that included the encrypted text. In this example, the publisher of the user interface 200 may want to view how the users change the quantities in the quantity form 240 to ensure that the form functions properly and users are able to specify their desired quantities without error or frustration. However, the items being purchased may be considered sensitive information. Thus, the publisher may not generate a rule for the text 221 and 231 that represents the items. During playback, the text 221 and 231 is masked using the masking elements 321 and 331 in the playback of the user session.

The user interface 300 includes a session activity region 370 in which activities that occurred during the session being replayed are presented based on the session activity data. For example, the session activity region 370 presents information such as a time at which the session being replayed occurred (e.g., a day, date, time of day, and/or year), a type of browser that was used to conduct the user session, an Internet Protocol (IP) Address of a device at which the user session occurred, and/or a geographic location of the user device at which the user session occurred. The session activity region 318 can also present a number of activities (e.g., a number of clicks, focuses, page navigations, or other user interactions) that occur during the session.

The session activity region 370 also identifies and/or outlines various activities that occurred during the user session being replayed. For example, the session activity region 370 specifies that, during the session being replayed in the playback region 306 the user navigated to example-.com/products 371, focused on a quantity form 340 within the page 372, clicked the checkout button 373, navigated to example.com/checkout 374, and focused on an address box 375. The activities listed in the session activity region 370 can be arranged in the order in which they occur during the session. For example, the activity 371 occurred prior to the activities 372, 373, 374, and 375. Additionally, the activities listed in the session activity region 370 can be visibly represented in a hierarchical manner. For example, each of the activities 372 and 373 are offset to the right relative to the activity 371, thereby indicating that the activities 372 and 373 occurred during the visit to example.com/products 371.

The list of activities 370 can also provide contextual data regarding the activity. For example, activity 372 indicates that the user interaction "focus" occurred with the quantity form 340. The list of activities 370 can also provide information from the structure of the user interface related to each activity. For example, each activity can include information from nodes associated with the activity from a hierarchical representation of the user interface structure (e.g., from a DOM). In a particular example, activity 372 shows a portion of the DOM nodes that provide contextual information about the quantity form 340 (e.g., #header div . . . ). In some implementations, user interaction with the activity 372 will cause presentation of additional contextual information that is not presented in the list of activities 370 (e.g., a full set of DOM nodes that provide information related to the activity).

As replay of the session proceeds in the replay region 306, activity corresponding to the portion of the replay being presented can be highlighted. For example, after the user focuses on the quantity form 340, the user clicked on the checkout button 360. As the replay shows the mouse moving from near the quantity form 340 to the checkout button 360 (as illustrated by the dashed line), the activity 373 can be shaded (or highlighted) indicating the session activity that corresponds to the portion of the session currently being replayed. When the replay of the session reaches a point at which the user clicked the checkout button 360, the playback data can cause a shaded circle 362 to be presented, thereby visually conveying to the publisher that the user click occurred and a location of the user click on the checkout button 360. Similar animations can be used to visually convey to the publisher that other interactions occurred. For example, with reference to a touchscreen device, a similar shaded circle can be used to visually convey the occurrence of a user tap, and elongated shading animation can be used to illustrate a user swipe or other finger movement on the touchscreen.

As discussed above, a publisher can request replay of one of the other sessions (e.g., Session 2) from the user interface 300 (or another user interface). For example, user interaction with (e.g., a click of) Session 2 in the list of sessions 308 can initiate a request for session information about Session 2. In response to the request, the session playback system 110 can output, to the requesting device, playback data and session activity data related to Session 2. Upon receipt of the playback data and session activity data, the requesting device can replay Session 2 in the replay region 306, and present information about the activities that occurred during Session 2 in the session activity region 318.

In some implementations, the user interface 300 can include a filter element 304. The filter element 304 enables a publisher to filter sessions identified using, for example, the submitted search phrase. For example, a publisher may be interested in identifying only the sessions during which a user clicked on the checkout button 360, but did not ultimately make a purchase. In this example, the user can submit the search phrase "clicked checkout," and interact with the filter element 304 to select a filter that identifies only those sessions during which the user did not make a purchase (e.g., by clicking on a drop-down button and selecting the "did not purchase" option). This enables the publisher to quickly identify sessions of interest, and/or identify what might have prevented these users from making a purchase (e.g., issues with the user interface).

An example filter is provided here for purposes of illustration, but various other filters can be used and specified as desired. For example, publishers may be interested in evaluating only those sessions that were performed in a specific geographic region (e.g. Southeast United States, Central America, Europe) or only those sessions during which a user terminated the session prior to some specified duration (e.g., within 2 minutes). As discussed in more detail below, providing filters such as these and/or analytic information related to sessions identified using filters can provide a publisher with insight regarding how to better format their user interface and/or achieve specific business goals (e.g., increase sales).

In some implementations, the publisher of the user interface 200 can generate rules for the user interface 200 by simply interacting with the user interface elements in the playback of a user session. For example, if the publisher decides that it does not need to view the quantity of the item presented in the quantity form 240, the publisher can select the quantity value 342 in the replay region 306. The session playback system 110 can detect the selection and update the rule of the quantity value 242 of the quantity form 240. In this example, since there is a rule for the quantity form 240, the session playback system 110 would delete or make the rule inactive. The session playback system 110 can also delete the private key for the rule so that quantity values previously recorded could not be decrypted or presented during playback of sessions (including the session being presented in FIG. 3) going forward. In addition, for subsequent user sessions with the user interface 200, the quantity value 342 would be not be collected and sent to the session playback system 110.

The publisher can generate a new rule or reactivate the rule for the quantity form 240 by selecting the value 342 in the playback of Session 1 or another session with the user interface 200. For example, if there was no previous rule for the quantity form 240, the session playback system 110 can generate a new rule that enables the content of the quantity form 240 to be recorded. The session playback system 110 can also generate a key pair for the rule. When a user starts a session with the user interface 200, the rule and public key for the rule can be provided to the user device of the user so that the content of the quantity form 240 can be encrypted and sent to the session playback system 110 with the event data for the user session.

Example Processes for Generating Playback of User Sessions

Figure 4:
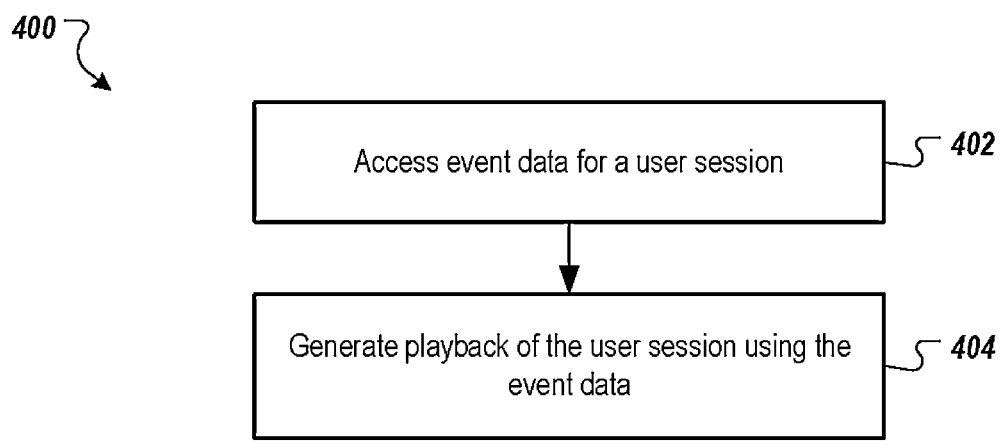
FIG. 4 is a flow chart of an example process for generating and providing an interactive interface that presents playback of a user session.

FIG. 4 is a flow chart of an example process 400 for generating and providing an interactive interface that presents playback of a user session. Operations of the process 400 can be performed, for example, by one or more data processing apparatus, such as the session playback system 110. Operations of the process 400 can also be implemented as instructions stored on a non-transitory computer readable medium. Execution of the instructions cause one or more data processing apparatus to perform operations of the process 400. For brevity, the process 400 is described in terms of the session playback system 110.

The session playback system 110 accesses event data (404). As described above, a user device can collect the event data and send the event data to the session playback system during the user session or at the conclusion of the user session. As described above, the event data can include interface data specifying a structure of the one or more user interfaces presented during the user session and user interaction data specifying user interactions with the one or more user interfaces. The event data can also include mutation data specifying changes to the structure of the user interface during the user session or frame bundles for each of multiple frames of the user interface(s) presented during the user session.

The event data can also include encrypted content elements for user interface elements that had a corresponding rule at the time of recording the user session. For each encrypted content element, the event data can also include an identifier for the rule that enabled the content to be encrypted and recorded. The event data can also include, for each user interface element, size data specifying the size of the content of the user interface element or the size of an object that included the content. In this way, a masking element can be generated during playback if the content is not included in the event data or if the private key(s) used to encrypt the content has been deleted.

The session playback system 110 generates playback of the user session using the event data (404). The playback of the user session can present the one or more user interfaces viewed during the user session. As described above, each user interface can be regenerated based on the event data and user interactions with the user interfaces can be presented based on the event data.

Playback of the user session can also include presentation of the content of user interface elements and/or masking elements in place of the content. The session playback system 110 can process event data for each user interface element of a user interface being regenerated. This processing can include determining whether an identifier for a rule is included in the event data for the user interface element. If so, the session playback system 110 can attempt to access the private key for the rule can be made. If the session playback system obtains the private key, the session playback system 110 can decrypt the content and present the content in its presentation location within the user interface. If not, the session playback system 110 can generate a masking element having the same size as the content using the size information in the event data.

If an identifier for a rule is not included in the event data for a user interface element, the session playback system 110 can generate a masking element having the same size as the content of the user interface element and present the masking element in the presentation location for the content. An example process for presenting content or a masking element for user interface elements is illustrated in FIG. 5 and described below.

The session playback system 110 can regenerate each user interface presented during the user interface in a similar manner until the user session has been presented or the publisher stops the playback of the user session.

Figure 5:
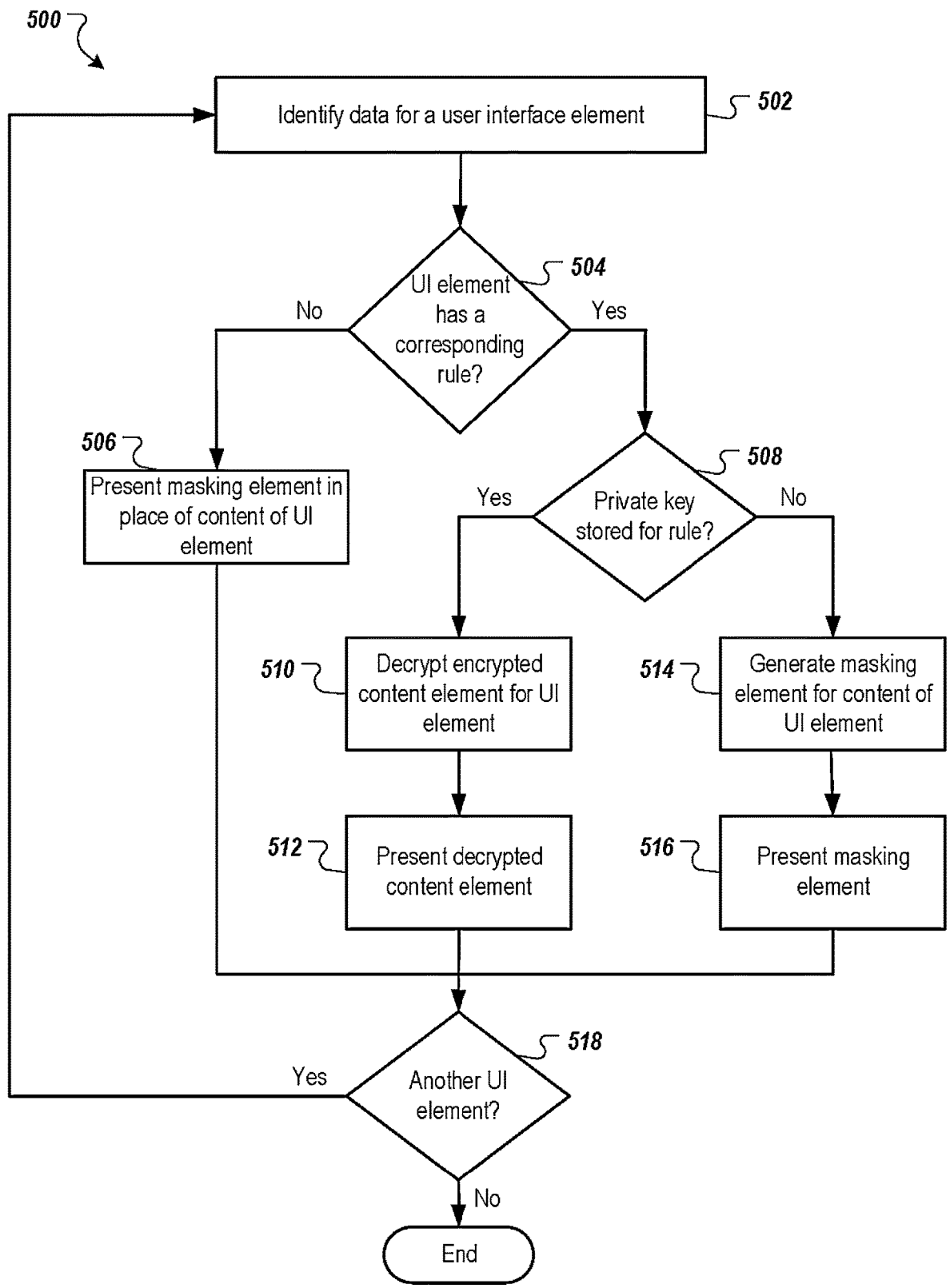
FIG. 5 is a flow chart of an example process for presenting content or a masking element for user interface elements.

FIG. 5 is a flow chart of an example process 500 for presenting content or a masking element for user interface elements. The process 500 can be performed while generating the playback of a user session. In particular, the process 500 can be performed to regenerate each user interface (or each updated user interface) presented during the user session.

Operations of the process 500 can be performed, for example, by one or more data processing apparatus, such as the session playback system 110. Operations of the process 500 can also be implemented as instructions stored on a non-transitory computer readable medium. Execution of the instructions cause one or more data processing apparatus to perform operations of the process 500. For brevity, the process 500 is described in terms of the session playback system 110.

The session playback system 110 identifies a user interface element (502). For example, the session playback system 110 can process the user interface elements of a user interface, e.g., in the event data for the user session or playback data generated based on the event data, in order based on timestamps or sequential ordering information. For each user interface element, the session playback system 110 can identify the data for the user interface element in the event data for the user session. For user interfaces presented in web browsers, the data for a user interface element can be included in mutation data of the event data. For user interfaces of native applications, the data for a user interface element can be included in a frame bundle for one or more frames of the user session.

The session playback system 110 determines whether the user interface element has a corresponding rule than enables content of the user interface element to be recorded and played back during user sessions (504). For example, the session playback system 110 can determine whether the data for the user interface element in the event data includes and identifier for a rule. The session playback system 110 can compare the identifier, if found, to a list of valid rule identifiers for valid rules. If the identifier matches a valid identifier, then the session playback system 110 can determine that the user interface element has a corresponding rule.

If the user interface element does not have a corresponding rule, the session playback system 110 generates and presents a masking element in place of the content of the user interface element (506). As described above, the event data can include size information that specifies the size of content of each user interface element or the size of an object in which the content was presented. The session playback system 110 can use the size information to generate a masking element that has the same size as the content but does not include the actual content of the user interface element. The session playback system 110 can present the masking element in the presentation location within the user interface where the actual content was presented during the user session.

If the user interface element does have a corresponding rule, the session playback system 110 determines whether a private key corresponding to the rule is stored (508). The session playback system 110 can query a key storage unit that includes the private keys for the publisher of the user interface using the identifier for the rule. If the identifier is found in the key storage unit, the session playback system 110 can obtain the private key linked to the matching identifier.

If the session playback system 110 is able to access the private key in the key storage unit, the session playback system 110 decrypts an encrypted content element using the private key (510). If the event data for the user interface element includes an identifier for a rule, the event data for the user interface element should also have an encrypted data element that includes the encrypted content that was encrypted using the public key corresponding to the rule. The session playback system can use the obtained private key corresponding to the rule to decrypt the encrypted content element.

The session playback system 110 presents the decrypted content (512). The session playback system 110 can present the decrypted content in the presentation location within the user interface where the content of the user interface element was presented during the user session.

If the session playback system 110 is not able to access the private key in the key storage unit, the session playback system 110 generates a masking element for the content of the user interface element (514). For example, the publisher of the user interface may have requested deletion of the private key to effectively delete the content presented in the user interface element from the session data store 112. The session playback system 110 can use the size information to generate a masking element that has the same size as the content but does not include the actual content of the user interface element.

The session playback system 110 presents the masking element (516). The session playback system 110 can present the masking element in the presentation location within the user interface where the actual content was presented during the user session.

The session playback system determines whether there are additional user interface elements to process (518). The session playback system can determine whether all of the user interface elements presented for a frame of the user session has been processed and redrawn in some form (e.g., as the actual content or a masking element) within the regenerated user interface. If not, the process 500 returns to step 502 to process another user interface element. If so, the process 500 ends. Of course, the process 500 can continue for each frame or each user interface presented during the user session.

Example Process for Identifying and Removing Content from Session Data

Figure 6:
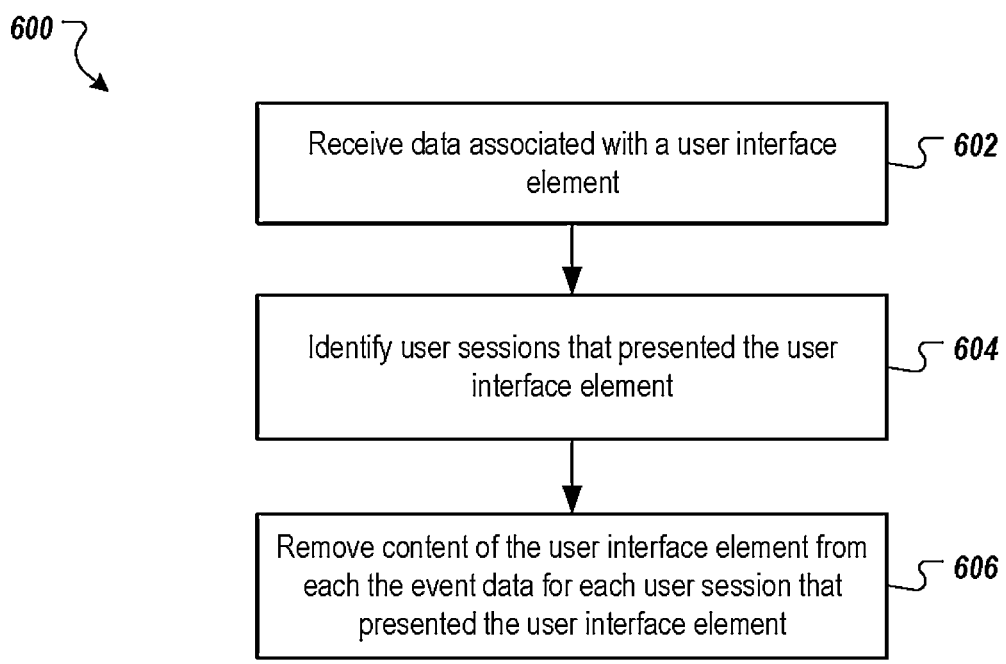
FIG. 6 is a flow chart of an example process for finding and removing content of user interface elements stored in session data.

FIG. 6 is a flow chart of an example process 600 for finding and removing content of user interface elements stored in session data. Operations of the process 600 can be performed, for example, by one or more data processing apparatus, such as the session playback system 110. Operations of the process 600 can also be implemented as instructions stored on a non-transitory computer readable medium. Execution of the instructions cause one or more data processing apparatus to perform operations of the process 600. For brevity, the process 600 is described in terms of the session playback system 110, but could be implemented in other systems.

The session playback system 110 receives data associated with a user interface element (602). The data can identify a user interface element for which content of the user interface is to be removed from stored session data. For example, a publisher can provide data identifying a user interface element, e.g., a selector for a user interface element, for which the publisher is requesting removal of its content.

In another example, the publisher can provide data identifying a rule associated with a user interface element. For example, the publisher may determine that a rule that enables collection of content of a particular user interface element is faulty and/or should be discontinued. In response, the session playback system 110 can identify the user interface element corresponding to the rule.

The session playback system 110 identifies user sessions that presented the user interface element corresponding to the rule (604). As described above, the session data store 112 can include an index. The index can include, for each user session, data identifying the user interface elements (e.g., data identifying selectors corresponding to the user interface elements) that were presented during the user session. The identifier or selector can correspond to class name or identifier, tags, attributes, or a view. In this example, the session playback system 110 can search the index for each user session that includes the user interface element or selector.

The session playback system 110 removes the content of the user interface element from the session data for each identified user session (606). In some implementations, the session playback system 110 deletes (or otherwise removes or extracts) the content of the user interface element from the session data. For example, the recording module 122 can be configured to collect and include in the event data 115 the size of text, images, and other content and/or the size of objects that include the content during the user sessions. In this example, the session playback system 110 can use this size data to generate a masking element in place of the content during playback of the user sessions so that the user sessions appear the same as the actual user session but with a masking element in place of the deleted content. In some implementations, the session playback system 110 replaces the deleted content with a masking element in the session data for the user sessions so that such replacement happens before playback of the user sessions.

In some implementations, the session playback system 110 can redact content of an updated rule, new rule, or for a particular user interface element during playback of a user session. For example, it may take some time to search and remove content from the session data for a publisher. If a user, e.g., an employee of the publisher or the operator of the session playback system 110 requests playback of a user session, the session playback system 110 can redact the content of the updated rule, new rule, or for a particular user interface element during playback. In this example, the session playback system 110 can monitor for the user interface element to be redrawn or otherwise recreated during playback, e.g., by monitoring for the identifier or selector for the user interface element. If the user interface element is detected, the session playback system 110 can replace the content of the user interface element with a masking element, e.g., in real time during playback of the session. This prevents presentation of the content of the user interface element even while the session data is being cleared of the content of the user interface element.

In some implementations, the session playback system 110 maintains a log of users that view user sessions. For each user session, the log can include data identifying each user that viewed the user session and a time at which the user viewed the user session. The session playback system 110 can use the log to determine if any users viewed user sessions (and who the users are if any) that included content that is being or has been deleted based on an updated rule, new rule, or request from the publisher.

For example, when a publisher determines that a rule is allowing sensitive data to be collected from user sessions, the publisher can update the rule or request that such data is deleted, as described above. The publisher may also want to audit who, if anyone, may have viewed such sensitive data by viewing the playback of a user session. The publisher can send a request that includes data identifying the rule that resulted in the sensitive data being collected or an identifier for the user interface element that included the sensitive data to the session playback system 110. In turn, the session playback system 110 can identify the user sessions that included the user interface element, as described above. The session playback system 110 can then access the log to determine who, if anyone, viewed the identified sessions and return this information to the publisher that submitted the request.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   accessing, for a user session in which one or more user interfaces were displayed, event data that includes:
      for each of a plurality of user interface elements for which content was presented by the one or more user interfaces during the user session:
         an encrypted content element comprising the content of the user interface element encrypted using an encryption key of a key pair corresponding to the user interface element, wherein the key pair corresponding to the user interface element includes the encryption key and a decryption key corresponding to the encryption key; and
   generating playback of the user session, the generating including:
      for each user interface element of a plurality of user interface elements:
         determining whether a key storage unit includes the decryption key of the key pair corresponding to the user interface element;
         responsive to determining that the key storage unit includes the decryption key of the key pair corresponding to the user interface element, decrypting the encrypted content element for the user interface element to obtain the content of the user interface element and displaying the content of the user interface element during the playback of the user session; and
         responsive to determining that the key storage unit does not include the decryption key corresponding to the user interface element, displaying, in place of the content of the user interface element, a masking element.

2. The method of claim 1, wherein the key pair corresponding to each user interface element is a key pair for a rule that defines controls on collection and playback of content of the user interface element.

3. The method of claim 2, further comprising:
   receiving a request to delete a given rule; and
   in response to receiving the request to delete the given rule,
      deleting the given rule from a set of active rules that are downloaded to client devices prior to or during user sessions with user interfaces; and
      deleting the decryption key of the key pair for the given rule.

4. The method of claim 1, wherein the encryption key of each key pair comprises a public key and the decryption key of each key pair comprises a private key corresponding to the public key of the key pair.

5. The method of claim 1, wherein displaying, in place of the content of the user interface element, the masking element comprises:
   determining a presentation size of an object that includes the content of the user interface element; and
   sizing the masking element based on the presentation size of the object.

6. The method of claim 1, wherein the one or more user interfaces display a set of user interface elements that includes one or more whitelisted user interface elements and one or more non-whitelisted user interface elements, the method further comprising:
   providing, to a client device at which the user session occurs and prior to the user session occurring, the encryption key of the key pair corresponding to each whitelisted user interface element.

7. The method of claim 6, further comprising providing, to the client device, data that causes the client device to:
replace content of each non-whitelisted user interface element with a corresponding masking element; and
provide the corresponding masking element for each non-whitelisted element with the event data.

8. A system comprising:
a data storage device; and
one or more computers that interact with the data storage device and execute instructions that cause the one or more computers to perform operations comprising:
accessing, for a user session in which one or more user interfaces were displayed, event data that includes:
for each of a plurality of user interface elements for which content was presented by the one or more user interfaces during the user session:
an encrypted content element comprising the content of the user interface element encrypted using an encryption key of a key pair corresponding to the user interface element, wherein the key pair corresponding to the user interface element includes the encryption key and a decryption key corresponding to the encryption key; and
generating playback of the user session, the generating including:
for each user interface element of a plurality of user interface elements:
determining whether a key storage unit includes the decryption key of the key pair corresponding to the user interface element;
responsive to determining that the key storage unit includes the decryption key of the key pair corresponding to the user interface element, decrypting the encrypted content element for the user interface element to obtain the content of the user interface element and displaying the content of the user interface element during the playback of the user session; and
responsive to determining that the key storage unit does not include the decryption key corresponding to the user interface element, displaying, in place of the content of the user interface element, a masking element.

9. The system of claim 8, wherein the key pair corresponding to each user interface element is a key pair for a rule that defines controls on collection and playback of content of the user interface element.

10. The system of claim 9, wherein the operations comprise:
receiving a request to delete a given rule; and
in response to receiving the request to delete the given rule,
deleting the given rule from a set of active rules that are downloaded to client devices prior to or during user sessions with user interfaces; and
deleting the decryption key of the key pair for the given rule.

11. The system of claim 8, wherein the encryption key of each key pair comprises a public key and the decryption key of each key pair comprises a private key corresponding to the public key of the key pair.

12. The system of claim 8, wherein displaying, in place of the content of the user interface element, the masking element comprises:

determining a presentation size of an object that includes the content of the user interface element; and
sizing the masking element based on the presentation size of the object.

13. The system of claim 8, wherein the one or more user interfaces display a set of user interface elements that includes one or more whitelisted user interface elements and one or more non-whitelisted user interface elements, the operations comprising:
providing, to a client device at which the user session occurs and prior to the user session occurring, the encryption key of the key pair corresponding to each whitelisted user interface element.

14. The system of claim 13, wherein the operations comprise providing, to the client device, data that causes the client device to:
replace content of each non-whitelisted user interface element with a corresponding masking element; and
provide the corresponding masking element for each non-whitelisted element with the event data.

15. A non-transitory computer readable medium storing instructions that upon execution by one or more computers cause the one or more computers to perform operations comprising:
accessing, for a user session in which one or more user interfaces were displayed, event data that includes:
for each of a plurality of user interface elements for which content was presented by the one or more user interfaces during the user session:
an encrypted content element comprising the content of the user interface element encrypted using an encryption key of a key pair corresponding to the user interface element, wherein the key pair corresponding to the user interface element includes the encryption key and a decryption key corresponding to the encryption key; and
generating playback of the user session, the generating including:
for each user interface element of a plurality of user interface elements:
determining whether a key storage unit includes the decryption key of the key pair corresponding to the user interface element;
responsive to determining that the key storage unit includes the decryption key of the key pair corresponding to the user interface element, decrypting the encrypted content element for the user interface element to obtain the content of the user interface element and displaying the content of the user interface element during the playback of the user session; and
responsive to determining that the key storage unit does not include the decryption key corresponding to the user interface element, displaying, in place of the content of the user interface element, a masking element.

16. The non-transitory computer readable medium of claim 15, wherein the key pair corresponding to each user interface element is a key pair for a rule that defines controls on collection and playback of content of the user interface element.

17. The non-transitory computer readable medium of claim 16, wherein the operations comprise:
receiving a request to delete a given rule; and
in response to receiving the request to delete the given rule, deleting the given rule from a set of active rules that are downloaded to client devices prior to or during user sessions with user interfaces; and deleting the decryption key of the key pair for the given rule.

18. The non-transitory computer readable medium of claim 15, wherein the encryption key of each key pair comprises a public key and the decryption key of each key pair comprises a private key corresponding to the public key of the key pair.

19. The non-transitory computer readable medium of claim 15, wherein displaying, in place of the content of the user interface element, the masking element comprises:

determining a presentation size of an object that includes the content of the user interface element; and sizing the masking element based on the presentation size of the object.

20. The non-transitory computer readable medium of claim 15, wherein the one or more user interfaces display a set of user interface elements that includes one or more whitelisted user interface elements and one or more non-whitelisted user interface elements, the operations comprising:

providing, to a client device at which the user session occurs and prior to the user session occurring, the encryption key of the key pair corresponding to each whitelisted user interface element.

\* \* \* \* \*